May 5, 1964　　　　H. T. DEININGER　　　　3,132,236
METHOD FOR ELIMINATING SURFACE DEFECTS
ASSOCIATED WITH INDIRECT WELDING
Filed Nov. 20, 1961

INVENTOR.
Harry T. Deininger.
BY John B. Sowell
ATTORNEY

United States Patent Office 3,132,236
Patented May 5, 1964

3,132,236
METHOD FOR ELIMINATING SURFACE DEFECTS ASSOCIATED WITH INDIRECT WELDING
Harry T. Deininger, Moorestown, N.J., assignor to The Budd Company, Philadelphia, Pa., a corporation of Pennsylvania
Filed Nov. 20, 1961, Ser. No. 153,342
7 Claims. (Cl. 219—91)

This invention relates to improvements in the art of resistance welding and more particularly to selectively welding two sheet metal panels of a three layer lap joint without deforming the third face layer.

Heretofore various methods of avoiding indentures in spot welds have been suggested, but none of the methods suggested have resulted in a full size weld adjacent a face sheet without forming indentures in the face sheet.

It is the present practice in the automobile industry to make the outer face of automobile doors as a single pressed metal panel. The edges of this outer panel are folded back one hundred and eighty degrees and clamped over an inner panel creating a three layer lap joint. The problem is to weld the folded flange of the outer panel to the flange of the inner panel by resistance spot welding without creating weld marks in the outer face panel. When the three layer joint is clamped between electrodes and welded directly as in conventional spot welding, two distinct welds start forming, one between the outer face panel and the inner panel flange, and a second weld between the inner panel flange and the folded edge of the outer face panel. These two welds may grow into a single weld nugget formed completely through the center metal sheet which is the inner panel flange. Indentures are formed in the outer panel and the folded edge of the outer panel at the point where the weld is made. Spot welding indentures have two distinct causation factors. Pressure required on the hard electrodes in order to make a full growth weld will leave dents in the relatively soft sheet metal, especially when the metal sheets have any play between them. As a spot weld is being made on two sheets, the adjacent inner surfaces of the two metal sheets reach a plastic state as the interface resistance is higher than the electrode-to-face resistance, thus causing the weld nugget to spread or grow at a point removed from the outer faces of the sheets. Although the welding current is terminated before the weld nugget grows completely through the thickness of the outer sheets, the weld nugget created is a soft spot opposite the electrodes which allows the electrodes to indent the metal sheet more easily. Secondly, the nugget of plastic metal also shrinks upon cooling drawing the outer surfaces of the metal sheets into the nugget area.

The automobile industry has long been plagued with indentures from spot welds which show on an otherwise mirror smooth surface. Up to the present time these indentures have been minimized by employing the "indirect welding method" disclosed and claimed in U.S. Patent No. 1,861,970. In recent years the sheet metal used by the automotive industry has been of a very thin gage in order to reduce weight and increase performance. Indentures made by the aforementioned indirect welding method in thin gage metals are visible and detract from the otherwise smooth die finished panels. In order to eliminate these indentures the present practice is to hand finish the panel by removal of metal. This practice has not met with approval for up to one third the thickness of an already thin gage sheet is removed by expensive hand finishing. This leads to rapid deterioration in the window wells of doors where water and moisture collect.

Some manufacturers have compromised the situation by reducing the size of the weld thus reducing the size of the indenture, and have more recently added non-hardening adhesive in the lap joint in order to strengthen the sub-standard welds.

The principal object of the invention is to provide a method of spot welding two adjacent sheets of three or more overlapping sheets of metal without leaving an indenture or weld mark upon the other sheets.

Another object is to provide a method of producing a full size weld between two adjacent metal sheets in a stack of sheets.

Another object is to provide a hard protective electrical and thermal insulation barrier-sealer in a lap joint of an automobile door panel.

A preferred method of carrying out the invention comprises the steps of, forming a lap joint of sheet metal with a hardened thermal barrier paint interposed between the sheet to be protected and two sheets to be welded, placing a first electrode adjacent one of two sheets to be welded, placing an electrically isolated back-up plate opposite the first electrode and adjacent the sheet to be protected, placing a second electrode adjacent the other sheet to be welded at a point removed from said first electrode, and applying current and pressure to said electrodes to form a full growth weld nugget between said two sheets to be welded without forming heat marks or electrode marks on the sheet to be protected.

A specific description of the illustrated embodiments of the invention now follows, and should be read in connection with the accompanying drawings wherein.

Figure 1:
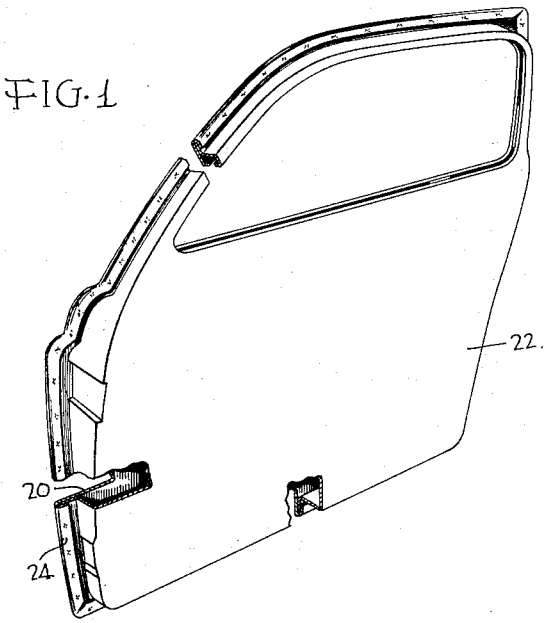
FIG. 1 is a perspective view of a typical automobile door having lapped joint flanges.
Figure 2:
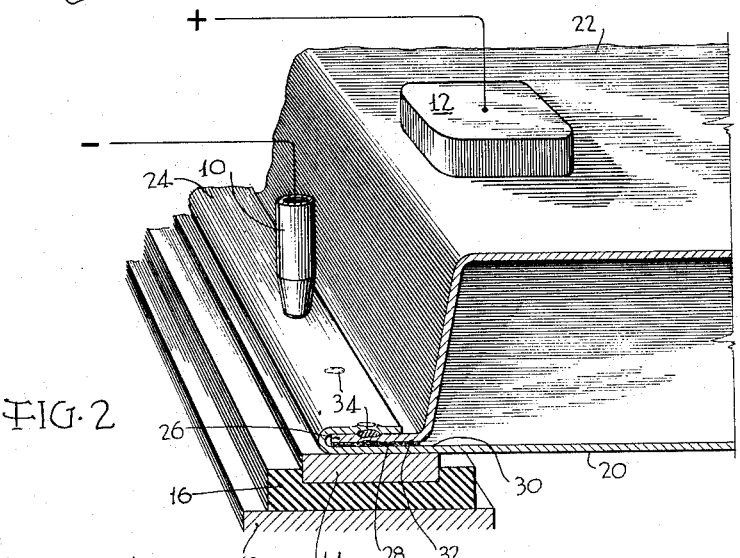
FIG. 2 is a sectional view in perspective showing a section of the automobile door being welded.

The apparatus shown in FIG. 2 comprises conventional welding equipment consisting of electrodes 10 and 12, a hard metal back-up plate 14 imbedded in an isolation plate 16 and supported by a fixture 18. It is common practice to extend the plates 14 and 16 and the fixture 18 entirely around the outer periphery of the door beneath the flange to be welded thus to insure that the formed metal sheets are not damaged during the welding operation. While the back-up plate 14 is shown as a flat section it is preferred that this plate conform to the contour of the door panel.

Outer panel 20 is formed separate and apart from the inner panel 22. The two panels are aligned in a fixture (not shown) and the outer panel flange 24 is turned 180° to overlap and encompass the inner panel flange 26. Prior to the assembly of the panels 20 and 22 a thermal barrier paint 28 is applied to either the inner face 30 of the outer panel or to the outer face 32 of the inner panel flange. Prior to the assembly of the panels 20 and 22 it is necessary that the thermal barrier paint be dried sufficient to support compressive stresses. It has been found that commercially available paints such as "thermal barrier coatings" supplied by M. A. Bruder of Philadelphia, Pa. which employ metal oxide pigments, alkyd resin vehicle with typical solvent and drier additives will set hard enough to support compression by air drying for a few hours. A high viscosity mixture of powdered mica and non-inflammable resins with quick drying solvents will set up in a few minutes. Other mixtures of metal or their oxides which have heat and electrical insulation qualities may be employed.

In order to provide a full growth weld nugget 34 it is preferable to employ an indirect welding method such as that shown in FIG. 2 wherein: One of the two electrodes is applied to a surface area of the inner panel 22 remote from the inner panel flange 26. The other electrode 10 is applied to the outer panel flange 24. When sufficient pressure is applied to the electrode 10 it causes an area of the flanges 24 and 26 just under the tip of the electrode 10 to be held very tight creating a point of low surface resistance. Electrodes 10 and 12 are high conductivity metals and the sheet metal to electrode resistance between these electrodes is held to a minimum by applying pressure and/or extending the area of the electrode as shown at electrode 12. When welding current is applied between electrodes the current flows from electrode 10 to the flange 24 through the pressure point of contact directly beneath the electrode to the flange 26 and back to electrode 12. The usual welding procedure is to employ alternating current and during the reverse cycle the current flows from electrode 12 to electrode 10. In the aforementioned described series circuit the point of highest resistance is at the adjacent surface areas of the flanges 24 and 26 directly beneath electrode 10. The weld nugget 34 is first formed at this area and continues to grow until it reaches a point intermediate but short of the thickness of the flange sheets. As a prerequisite to proper welding the pressure on the electrode 10 must be maintained as the weld nugget 34 progresses, even though the pressure of the electrode 10 causes a small indenture in the flange 24. If the weld nugget is allowed to grow to full strength and size, the plastic area upon cooling will shrink and cause a further indenture in flange 24. Since flange 24 is on the hidden side of the door and will be covered with weather stripping, the weld marks on flange 24 are not seen.

Figure 3:
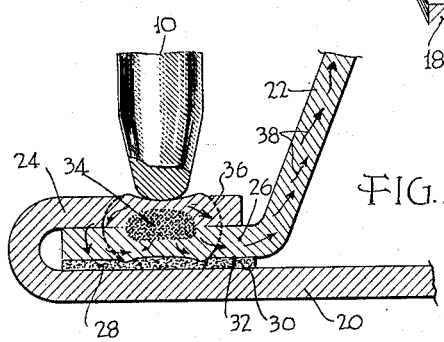
FIG. 3 is an enlarged cross-section of the lap joint illustrating the principle of the invention.

In FIG. 3 an enlarged section of the completed weld is shown. Superimposed on this enlarged section are dotted lines 36 to show the zone of high heat concentration, and flux lines 38 to show the current distribution during welding. Directly beneath the electrode 10 the flux lines 38 are heavily concentrated in flange 24 and less heavily concentrated in flange 22. Due to the heavier concentration of current, illustrated by flux lines 38, the weld nugget 34 progresses further into flange 24 than flange 22. During the growth of the weld nugget 34 the electrode 10 presses into sheet 24 and forms a cup with a slight ring or raised portion surrounding it. In similar manner a cup is formed opposite weld 34 on flange 22 due to the shrinkage of the nugget 34. It can be observed from FIG. 3 that had the thermal barrier 28 been omitted the flux lines 38 would have continued directly through flanges 24 and 22 into the outer panel 20. Since outer panel 20 is in fact a part of flange 24 it forms a continuous electrical circuit therethrough but due to the insulating qualities of the heat barrier 28 there is no return path through panel 20 back to electrode 12. Thermal barrier 28 not only prevents the heat accumulated in weld nugget 34 from reaching panel 20 but it further prevents a current path between electrodes 10 and 12 via panel 20. In the preferred embodiment of the invention the heat barrier strip 28 was extended completely around the inner panel flange 26 and back-up plate 14 was insulated to electrically isolate any shunt paths through panel 20.

Dotted lines 36 illustrate the heat zone which is formed during the welding operation. This heat zone reaches temperatures approaching 2000° F. causing extremely low yield strength in low carbon steel. Weld nugget 34 reaches temperatures approaching 3000° F. at which there is no structural strength. Weld 34 is isolated in the interior of the two adjacent flanges 22 and 24 as a soft spot. The pressure exerted by welding electrode 10 is usually over 10,000 p.s.i. and may approach 30,000 p.s.i. directly under the tip of the electrode. Welding electrode 10 deforms some of the metal in heat zone 36 and in weld nugget 34 in their low yield condition or plastic state.

Heat barrier 28 should be formed in such a manner that the deposited heat barrier has good electrical and thermal insulation qualities and that the hardened heat barrier strip be capable of supporting the pressure of the electrode 10 without failing in compression. It has been found that powdered mica and powdered metallic oxides used as a pigment consisting of 50 to 85% of a mixture employing non-inflammable alkyd resin vehicle combined with a solvent and drier solution are entirely satisfactory for purposes of practicing the invention. A thickness of 4 to 8 mils is sufficient to protect carbon steel sheet 35 mils thick when welding with currents of 8 to 14 thousand amperes.

It will be apparent that arc spot welding may be employed to eliminate excessive electrode pressures and would allow modifications and adaptations in the placement of the electrodes. Reduction in welding pressures would allow modification of the hard compression-supporting thermal-barrier paint in the lap joint flanges or stacks of metal sheets. Selectivity of two sheets of a plurality of sheets may be accomplished by modifications and adaptations well known to those skilled in the art and such adaptations are only limited by the scope of the appended claims.

What is claimed is:

1. A method of welding the lap joint flange of an outer panel of an automobile door or the like to a flange of an inner panel comprising the steps of: forming an outer panel of sheet metal with an open flange portion, forming an inner panel of sheet metal with a turned flange portion, applying an insulating thermal barrier paint to the outer face of the flange of said inner panel, drying said paint until it is hard, assembling said inner panel and said outer panel by turning said flange portion of said outer panel over said flange portion of said inner panel to form a lap joint, placing said lap joint between a first electrode and a back-up plate, placing a second electrode on said inner panel, and applying current and pressure to said first electrode while completing an electrical circuit to said second electrode to for a weld nugget between said flanges without causing indenture in said outer panel.

2. A method as set forth in claim 1, wherein said thermal barrier paint comprises an insulating thermal barrier mixture of metallic oxide pigment in an alkyd resin carrier.

3. A method as set forth in claim 1, wherein said insulating thermal barrier paint comprises a mixture of mica pigment and synthetic resin carrier.

4. A method of welding the lap joint flange of an outer panel of an automobile door or the like to a flange of an inner panel comprising the steps of: forming an outer panel of sheet metal with an open flange portion, forming an inner panel of sheet metal with a turned flange portion, applying an insulating thermal barrier paint to the inner face of said outer panel, drying said paint until it is hard, assembling said inner panel and said outer panel by turning said flange portion of said outer panel over said turned flange portion of said inner panel to form a lap joint enclosing said thermal barrier paint between said inner face of said outer panel and the outer face of said inner panel, and welding said lap joint flange to said turned flange portion of said inner panel by passing welding current from said lap joint flange of said outer panel to said turned flange portion of said inner panel.

5. A method of welding the lap joint flange of the outer panel of an automobile door to an inner panel flange comprising the steps of: forming a door of an inner panel insulated from the outer panel on one side and in metal to metal contact at the inner flange and the lap joint flange on the other side, and passing a current sufficient to cause welding from a point on said lap joint flange to said inner flange without passing current through said outer panel.

6. A method of welding the lap joint flange of an outer panel to a flange of an inner panel comprising the steps of: forming an inner panel flange, coating an area of said inner flange with an insulating fluid, hardening said fluid to a solid state, forming the edge of an outer panel around and over said inner panel flange to form a stack of three sheets in a lap joint having the outer panel and the inner panel flange separated by said hardened insulation fluid, and forming a weld nugget by indirect welding between the lap joint flange and the inner panel flange.

7. The method of eliminating weld and weld marks in an outer sheet of a stack of sheets comprising: placing the sheet to be protected on an electrically isolated back-up plate, placing a hardenable fluid on the back side of the sheet to be protected and hardening said fluid to an insulating solid state, placing a plurality of sheets on top of said sheet to be protected with said hardened fluid interposed therebetween, clamping a pressure electrode on top of said stack of sheets, making electrical contact with two of said plurality of said sheets, and welding the sheets in series between said electrical contacts.

References Cited in the file of this patent

UNITED STATES PATENTS

| | | |
|---|---|---|
| 1,703,541 | Pierson | Feb. 26, 1929 |
| 1,861,970 | Meadowcroft | June 7, 1932 |
| 2,452,805 | Sussenback | Nov. 2, 1948 |
| 2,970,204 | Piceu et al. | Jan. 31, 1961 |

FOREIGN PATENTS

| | | |
|---|---|---|
| 825,910 | France | Dec. 16, 1937 |